Patented Mar. 1, 1938

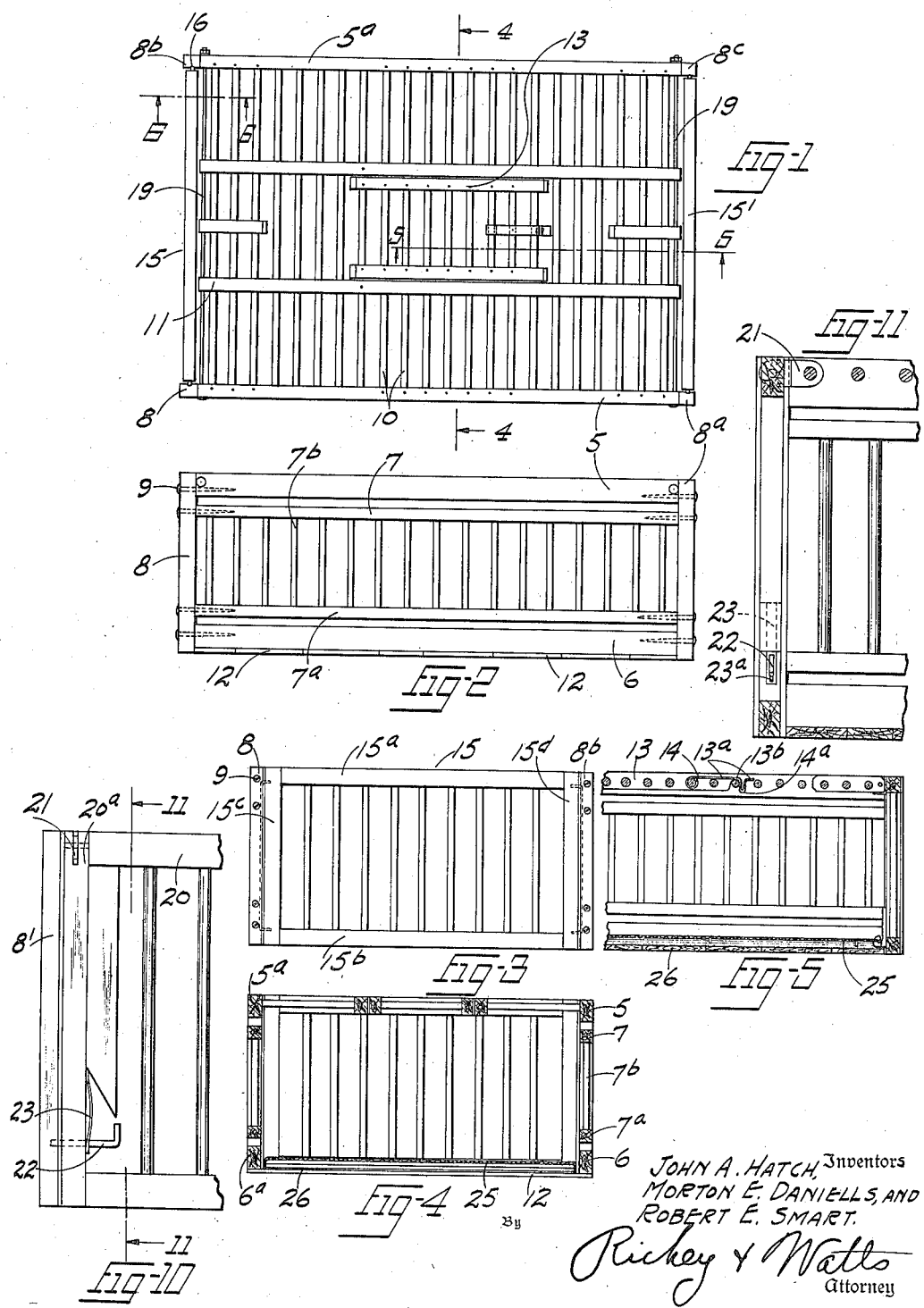

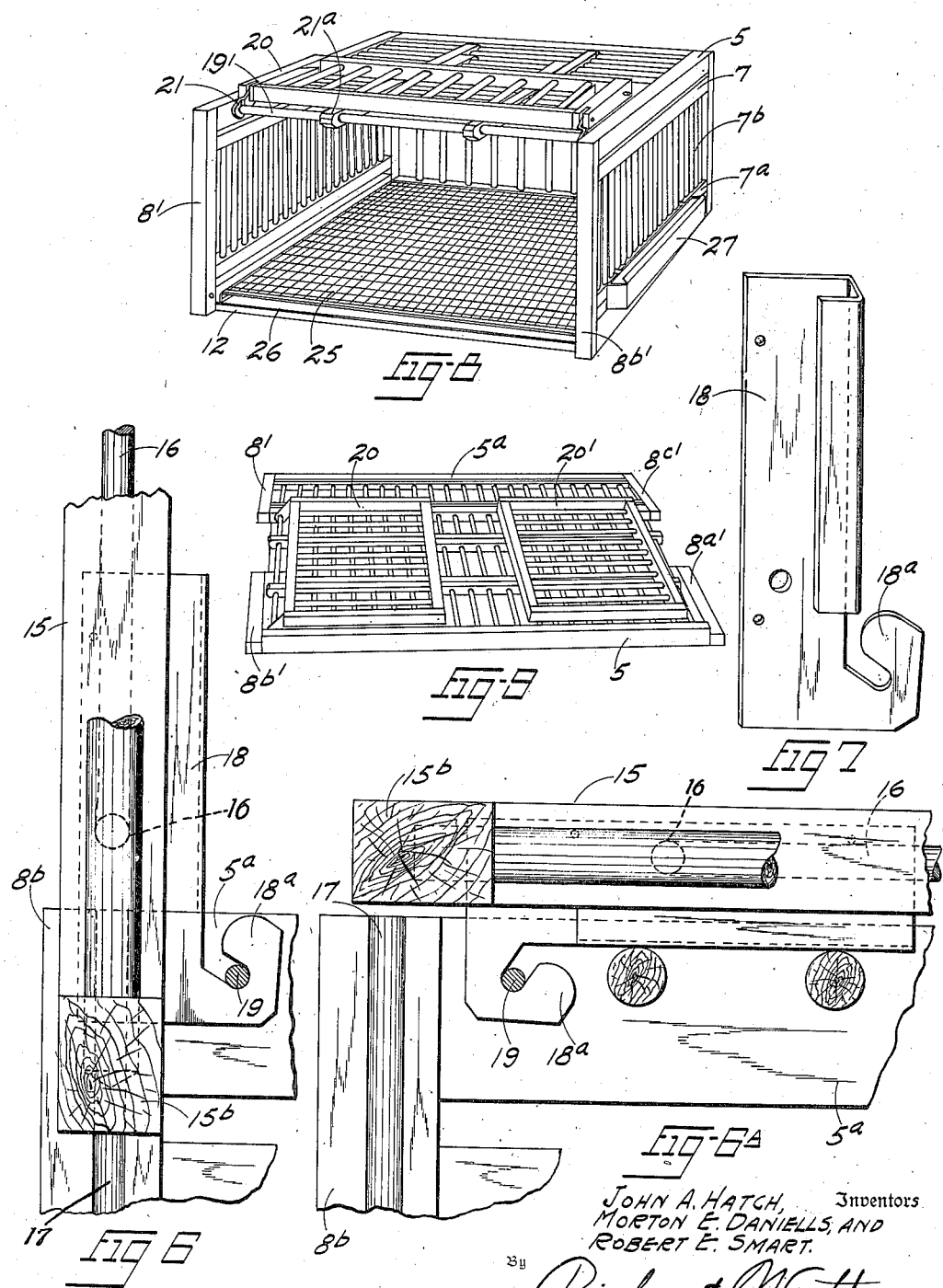

2,109,902

UNITED STATES PATENT OFFICE 2,109,902

POULTRY CRATE

John A. Hatch, Penn-Yan, N. Y., and Morton E. Daniells and Robert E. Smart, Cleveland, Ohio; said Daniells and said Smart assignors to said Hatch Application August 2, 1935, Serial No. 34,394

6 Claims. (Cl. 217—47)

This invention relates to poultry crates, and the primary objects of the same are: to provide a crate of this type which is readily collapsible or foldable to a position such that it occupies only a fraction of the space occupied when in set-up position to thereby, among other advantages, effect a material saving in return transportation; to provide a collapsible crate which may be set up without the use of tools or screws, nails, bolts and the like, and which at the same time is strong and durable yet relatively light in weight and capable of long life or service despite the rough usage to which it is normally subjected; to provide a poultry crate which is adaptable for both shipping and temporary feeding and fattening and which is safe, sanitary and easily cleaned; to provide a crate which meets the requirements of the producer, transportation men and the consumer and which, in general, facilitates the work of handling poultry; and also a crate which may be economically manufactured.

The foregoing and other objects and advantages will become apparent in view of the following description taken in conjunction with the drawings, wherein:

Figure 1 is a top plan view of a crate embodying the principles of the invention;

Figs. 2 and 3 are respectively views in side and end elevation of the crate;

Figs. 4 and 5 are sectional views taken on the lines 4—4 and 5—5, respectively, Fig. 1;

Fig. 6 is a fragmentary sectional view taken on the line 6—6, Fig. 1 with the one end gate or door of the crate in raised position, and Fig. 6a is a similar view but showing the gate swung back and resting on top of the crate; and Fig. 7 is a detail view in perspective of one of the parts of the crate assembly;

Fig. 8 is a view in perspective of a crate in assembled position, but in this instance the end gates are of a modified construction and certain accessories are added to better adapt the crate to storage or temporary retention of live poultry;

Fig. 9 is a view of the crate of Fig. 8 in collapsed condition, the same showing being also applicable to the crate of Fig. 1;

Fig. 10 is a fragmentary view in end elevation of the crate of Fig. 8 with the end gate or door in down position; and Fig. 11 is a fragmentary sectional view taken on the line 11—11, Fig. 10.

Referring to the drawings in detail, and first to Figs. 1 to 7, inclusive, the body of the crate is preferably of the usual rectangular form having side frames which as shown are substantially identical in construction and comprising upper and lower rails 5, 5a, 6 and 6a, and an intermediate panel framework consisting of rails 7 and 7a which are connected by rods 7b, the construction being substantially similar on each side of the crate.

The rails 5, 6, 7, and 7a are pivotally connected to corner posts 8, 8a, 8b, and 8c preferably by means of headed pins or dowels 9. The top panel of the crate is made up of the usual rods defining an open framework 10 which is reinforced by members 11, while the bottom or floor of the crate is preferably made up of floor boards or the like generally indicated at 12. In the top panel, a door 13 is hinged and is provided with a latch 14, the latter preferably being in the form of a flexible strip of sheet metal or the like which at one end is bent double or looped to provide a catch 14a and at its opposite end is secured to one of the rods of the framework 10. This type of latch has a compounding gripping action in the event the crate is lifted by grasping the door, as is often done by the workmen who handle the crates, due to the fact that the pin 13a, which is the end cross pin of those that make up the door, exerts a leverage action on the strip 14 which draws the catch 14a against the relatively stationary pin 13b, which is one of the cross pins of the top framework.

An important feature of the present invention is the provision of end gates or doors in addition to the top door 13 which are arranged so that when either one or both are down, the crate is held in rigid set-up position, but when both of these gates are raised and swung back, the crate may be collapsed or folded by its own weight. These end gates or doors which are generally indicated at 15 and 15' may be and preferably are identical in construction and comprise top and bottom rails 15a and 15b and side posts 15c and 15d. In the form of crate shown in Figs. 1 to 7, inclusive, the end gates are mounted to slide vertically in the corner posts 8, 8a, 8b, and 8c, the arrangement being such that the doors always have a snug sliding engagement with said posts to thereby hold the crate in rigid set-up position. Accordingly, the side posts 15c and 15d each have anchored therein the opposite ends of a guide rod or runner 16 which is preferably of metal and somewhat resilient and is slightly buckled or bowed outwardly and engaged, under tension, in a groove 17, note particularly Figs. 3, 6, and 6a, formed in each of the corner posts 8, 8a, 8b, and 8c. This guide rod or runner may be made of wire of suitable gauge or may be made of any other suitable material, either round, polygonal or flat. However, by utilizing metal runners with wooden corner posts, a smooth and unhindered operation of the door is ensured, since metal will not warp due to moisture absorption or the temperature changes to which a crate of this type is normally subjected, and since also the groove preferably has a certain amount of side clearance and the runner is bowed outwardly under tension so that it will give inwardly in the event of a certain amount of warpage of the corner posts, such warpage is compensated for by this resilient runner construction.

Each corner post 15ᶜ and 15ᵈ has secured to the lower extremity thereof what may be termed a gate latch 18, note Figs. 6, 6ᵃ, and 7 which serves to retain the end gates in assembled position with the remaining parts of the crate when said gates are raised and swung back on top of the crate. This latch 18 is preferably in the form of a reinforcing channel member of sheet metal which fits over the corner post and has formed on the lower end thereof a hook 18ᵃ adapted to engage a reinforcing rod 19 which connects the top side rails 5 and 5ᵃ, see also Fig. 1, there being a rod 19 at each end of the crate.

In Fig. 6 the end gate 15 is shown raised vertically with the hook 18ᵃ in engagement with rod 19, while in Fig. 6ᵃ the gate has been swung back on top of the coop. If both gates are raised to the position shown in Fig. 6ᵃ, the entire crate or coop will collapse to a position like that shown in Fig. 9, but as long as either one of the end gates is closed or partly so, the crate will remain in rigid set-up condition.

If it is desired to remove either one or both of the end gates, it is only necessary to hold the gate at a position about intermediate those shown in Figs. 6 and 6ᵃ or at a point where the guide rod or runner 16 is clear of grooves 17, whereupon the gate may be slid at an incline outwardly and downwardly to free the hooks 18ᵃ of the rod 19. The guide rods 16 are circular in transverse section while the grooves are semi-circular and formed to envelop the outer half of the rod, thus providing longitudinal stability of the crate when the gates are lowered with the rod engaged in the grooves. The lower ends of the rods are bent inwardly and are seated in their respective corner posts in spaced relation from the end of the gate so that the rod will free the groove when the gate is lifted inwardly about the fulcrum formed by the rod 19 as shown in Figs. 6 and 6ᵃ. The same or a new gate may be substituted by reversing this procedure.

The body of the crate shown in Figs. 8 to 11, inclusive, is substantially the same as that first described but in this instance the end gates or doors are of the hinged type, or swing arcuately to open and closed position instead of sliding vertically. Accordingly, the parts which go to make up the body of the crate have been given the same reference numerals as in Figs. 1 to 5, inclusive, with the exception that the corner posts have been designated 8′, 8ᵃ′, and 8ᶜ′, since said posts lack the groove 17 and are therefore slightly different in construction.

The end gates or doors are generally indicated at 20 and 20′ and are each provided with hinges 21 and 21ᵃ which are pivotally mounted on a reinforcing cross rod 19′ which is substantially similar to the rod 19 used in the crate of Fig. 1. The end gates 20, 20′ are adapted to swing down substantially flush with the corner posts 8′, 8ᵇ′ and 8ᵃ′, 8ᶜ′, and each corner post 20ᵃ of the end gates has mounted in the lower extremity thereof a slidable, spring-pressed latch 22, which in the form shown consists of a pin having its one end bent into the form of a handle or finger grip and at its opposite end projects into a hole formed in the adjacent corner post. A leaf spring 23 is attached at one end to the gate post 20ᵃ and at its opposite end is formed with a slot 23ᵃ, note Fig. 11, and engages over a squared and shouldered portion of latch pin 22 and holds the latter against angular displacement in addition to maintaining it under spring tension.

In the perspective view in Fig. 8 the one end gate is shown raised and swung back on top of the crate, while in the end elevation in Fig. 10 the said gate is shown in its closed and latched position. If both gates are raised to the position shown in Fig. 8, the crate will fall to collapsed position as shown in Fig. 9.

In both forms of the crate the end gates hold the crates rigid when in closed position and permit collapsing or folding of the crates when in open position. However, with the vertically sliding door, the crate may be more readily adapted for use as a closed run-way for loading and analogous purposes. Thus the crates may be arranged in end to end relation and the sliding doors raised sufficiently for the fowls to clear but not to a point where the crates collapse, whereupon a closed run-way is provided. In both forms, the crates are, in effect, self contained, no tools or exterior parts such as screws, nails or the like being required to set up or collapse the crates. Also, each part of the crate may be manufactured as a separate unit and will thereafter be interchangeable or removable and replaceable.

When live poultry is stored over a certain period of time, it is essential that a high degree of sanitation be maintained to prevent sickness and spread of contagious diseases. With this in mind, we have provided a raised open-mesh floor 25 which fits in the bottom of the crate, and below this floor we preferably provide a liner 26 of heavy paper, tin or the like. Thus the droppings fall through the open-mesh floor onto the liner and are rendered inaccessible to the fowls, and the liner facilitates cleaning of the crate. On the side of the crate we provide a feed and water trough 27, note Fig. 8. With this combination of accessories, the problem of maintaining sanitary conditions during storage is greatly simplified. The open-mesh floor may be readily removed and returned, in compact form, with the foldable crate or crates heretofore described.

The entire crate may be readily disinfected by dipping when in collapsed condition, and obviously a collapsed crate involves far less space and simplifies the handling problem generally. The desirability of a collapsed crate has always been obvious, but heretofore, as far as we are aware, crates of the collapsible type have been more or less rickety and generally unsatisfactory. Experience has demonstrated that our improved crate is strong and rigid while at the same time has all the advantages of quick and ready collapsibility.

It will be understood that certain changes in construction and design are contemplated within the scope of the invention as defined by the appended claims.

We claim:

1. A poultry crate comprising a body of generally rectangular form having side panels, a top panel and a floor, said panels being provided with side rails, corner posts at opposite ends of said side panels which are pivotally connected to said side rails to permit the panels to swing laterally and collapse when in unsupported condition, cross rods connecting said side rails at opposite ends thereof, end gates mounted to slide vertically between said corner posts, a hinge bracket connected to the lower extremities of each of said gates and provided with a portion adapted to engage said rod when the gate is raised and swung back on the top panel, said gate when closed holding the body in rigid set-up condition.

2. A poultry crate comprising a body of generally rectangular form having side panels, a top panel and a floor, said panels being provided with side rails, corner posts at opposite ends of said side panels which are pivotally connected to said side rails to permit the panels to swing laterally and collapse when in unsupported condition, cross rods connecting said side rails with the opposite ends thereof, and gates arranged to slide vertically between said corner posts, the latter being provided with grooves extending longitudinally thereof and said gates having runners anchored therein and adapted to engage said grooves under tension, hinge brackets secured to the lower extremities of said gates and formed with hooked portions on the ends thereof adapted to engage said rods when the gates are raised and cause the gates to pivot on said rods and swing back on the top panel, said gates when closed holding the body in rigid set-up condition.

3. A poultry crate comprising a body of generally rectangular form having side panels, a top panel and a floor, said panels being provided with side rails, wooden corner posts at opposite ends of said side panels which are pivotally connected to said side rails to permit the panels to swing laterally and collapse when in unsupported condition, and gates having side frame members arranged to slide vertically between said corner posts, the latter being formed with longitudinal grooves and said gates having metal runners anchored in the frame members thereof and bowed outwardly to engage in the grooves under tension to thereby insure a snug sliding engagement of the runners in the grooves and hold the body of the crate rigid when the gates are closed, said gates when raised to bring the runners clear of the grooves permitting the body to collapse.

4. A poultry crate comprising a body of generally rectangular form having side panels, a top panel and a floor, said panels being pivotally connected to one another to permit the body to collapse when in unsupported condition, the side panels having grooves therein adjacent their inner vertical edges, pivots on said panels adjacent the top of said grooves, end gates slidably mounted in said grooves, and means on said end gates for engaging and encompassing said pivots when said end gates are elevated and folded down upon said top panel.

5. A poultry crate comprising a body of generally rectangular form having side panels, a top panel and a floor, said panels being pivotally connected to one another to permit the body to collapse when in unsupported condition, the side panels having grooves therein adjacent their inner vertical edges, fulcrum rods mounted on said panels adjacent the top of said grooves, end gates slidably mounted in said grooves, hooks mounted on said end gates adjacent the bottom thereof and engageable with said fulcrum rods when said end gates are elevated, said hooks having an off-set recess therein constituting a shoulder for engaging said fulcrum rods as the end gate is folded downward upon said top panel.

6. A poultry crate comprising a body of generally rectangular form having side panels, a top and a floor, said side panels being provided with side rails, corner posts having vertical semi-circular grooves therein disposed at the ends of said side panels and pivotally connected to said side rails to permit the panels to swing laterally and collapse when in unsupported condition, end gates intermediate said side posts, spring metal runners of circular transverse section mounted thereon and engaged within said grooves, said spring metal runners being compressively deformed when said gates are closed to hold said side panels under tension in rigid set-up condition, hooks on said end gates, a cross rod between said side panels disposed for engagement with said hooks and constituting a fulcrum therefor, said runners terminating in spaced relation from the ends of the end gates, whereby the runners will clear the grooves when the hooks are fulcrumed about said cross rod.

MORTON E. DANIELLS.
ROBERT E. SMART.
JOHN A. HATCH.